US012681235B2

(12) United States Patent
Liang et al.

(10) Patent No.: US 12,681,235 B2
(45) Date of Patent: Jul. 14, 2026

(54) SPOT-SIZE CONVERTER, PHOTONIC DEVICE AND METHOD FOR FABRICATING SPOT-SIZE CONVERTER

(71) Applicant: NANJING LYCORE TECHNOLOGIES CO., LTD., Nanjing (CN)

(72) Inventors: Hanxiao Liang, Nanjing (CN); Yipin Song, Nanjing (CN); Yingcong Zhou, Nanjing (CN); Haicang Wu, Nanjing (CN); Wenhao Mao, Nanjing (CN); Shiwei Song, Nanjing (CN); Weiqi Sun, Nanjing (CN); Qingyang Yu, Nanjing (CN); Zhouyu Zhang, Nanjing (CN)

(73) Assignee: NANJING LYCORE TECHNOLOGIES CO., LTD.

( * ) Notice: Subject to any disclaimer, the term of this patent is extended or adjusted under 35 U.S.C. 154(b) by 364 days.

(21) Appl. No.: 18/436,868

(22) Filed: Feb. 8, 2024

(65) Prior Publication Data

US 2024/0272356 A1 Aug. 15, 2024

(30) Foreign Application Priority Data

Feb. 13, 2023 (CN) .......................... 202310108343.9

(51) Int. Cl.
*G02B 6/122* (2006.01)
*G02B 6/136* (2006.01)
*G02B 6/12* (2006.01)

(52) U.S. Cl.
CPC .......... *G02B 6/1228* (2013.01); *G02B 6/136* (2013.01); *G02B 2006/12097* (2013.01); *G02B 2006/12152* (2013.01)

(58) Field of Classification Search
CPC .............................. G02B 6/1228; G02B 6/136
See application file for complete search history.

(56) References Cited

U.S. PATENT DOCUMENTS 8,326,100 B2 * 12/2012 Chen .................... G02B 6/1228
385/124
10,571,633 B1 * 2/2020 Chen ..................... G02B 6/136
(Continued)

FOREIGN PATENT DOCUMENTS

JP 2017-510855 A 4/2017
WO WO 2007091465 A1 8/2007
WO WO 2016060619 A1 4/2016

OTHER PUBLICATIONS

Chen et al., "Low-Loss and Broadband Cantilever Couplers Between Standard Cleaved Fibers and High-Index-Contrast Si3N4 Si or Si Waveguides," IEEE Photonics Technology Letters, Oct. 7, 2010, 22(23):1744-6.
(Continued)

*Primary Examiner* — Rhonda S Peace
(74) *Attorney, Agent, or Firm* — Fish & Richardson P.C.

(57) ABSTRACT

A spot-size converter, a photonic device, and a method for fabricating a spot-size converter are provided. The spot-size converter is provided with a first end face and a second end face parallel to each other and comprises a substrate, an isolation layer, a waveguide layer and a cover layer that are arranged in sequence. The substrate is provided with a first recess that is exposed to its top surface and the second end face. The isolation layer is provided with a second recess and a third recess that are exposed to its top surface and the second end face; the second recess is provided with a plurality of first holes communicating with the first recess, the third recess is provided with a plurality of second holes communicating with the first recess.

18 Claims, 8 Drawing Sheets

(56)                    References Cited

U.S. PATENT DOCUMENTS

| | | |
|---|---|---|
| 11,221,447 B1 | 1/2022 | Chen et al. |
| 2015/0293299 A1 | 10/2015 | Xu et al. |
| 2016/0187579 A1 | 6/2016 | Henze et al. |
| 2017/0293073 A1* | 10/2017 | Chen ...................... G02B 6/138 |
| 2024/0272356 A1* | 8/2024 | Liang ................... G02B 6/1228 |
| 2025/0044509 A1* | 2/2025 | Liang ................. G02B 6/12002 |

OTHER PUBLICATIONS

Extended European Search Report in European Appln. No. 24157194.
2, mailed on Jun. 20, 2024, 4 pages.
Office Action in Japanese Appln. No. 2024-019681, mailed on Dec.
13, 2024, 6 pages (with English Translation).

* cited by examiner

100

500

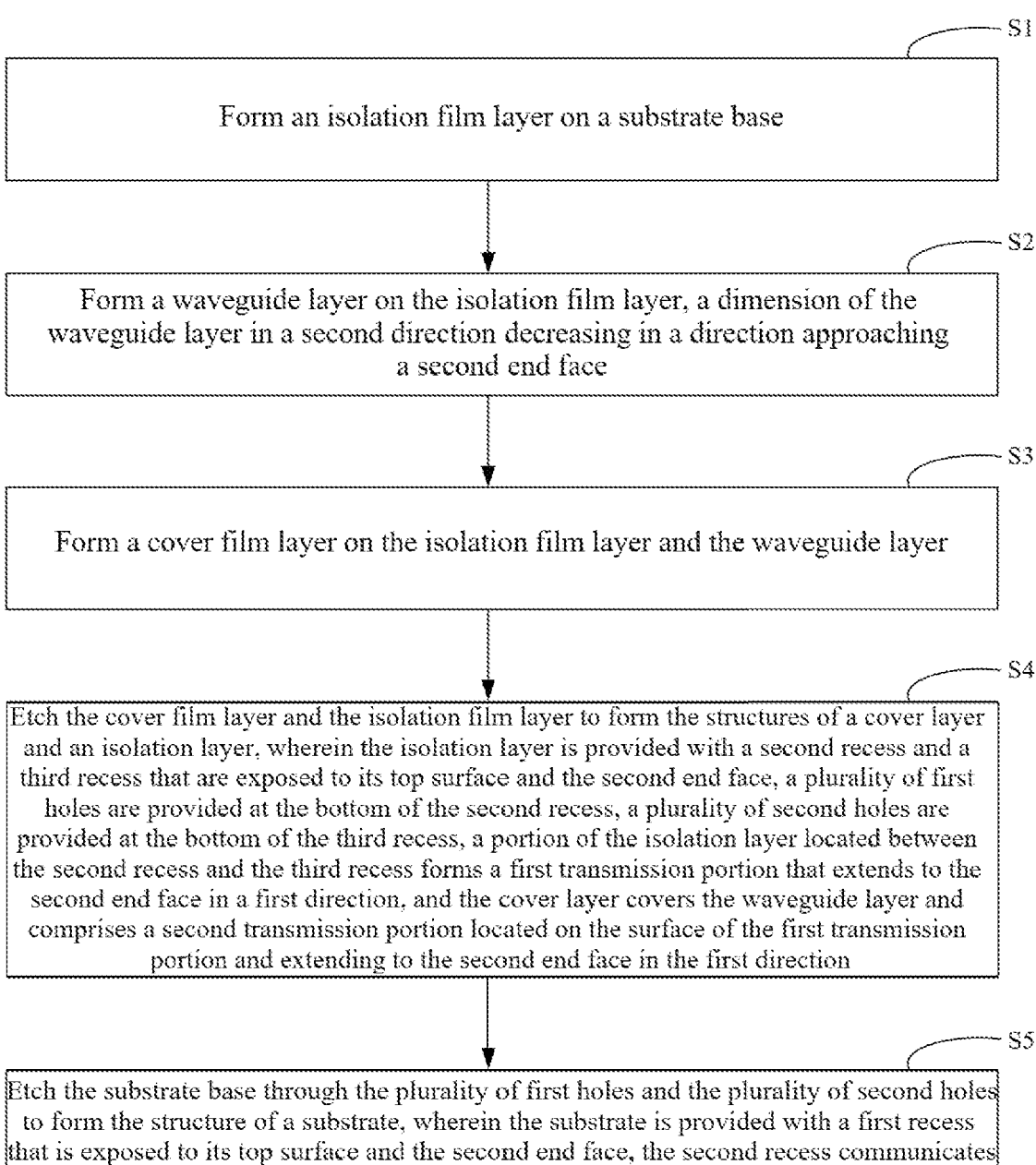

S1

Form an isolation film layer on a substrate base

S2

Form a waveguide layer on the isolation film layer, a dimension of the waveguide layer in a second direction decreasing in a direction approaching a second end face

S3

Form a cover film layer on the isolation film layer and the waveguide layer

S4

Etch the cover film layer and the isolation film layer to form the structures of a cover layer and an isolation layer, wherein the isolation layer is provided with a second recess and a third recess that are exposed to its top surface and the second end face, a plurality of first holes are provided at the bottom of the second recess, a plurality of second holes are provided at the bottom of the third recess, a portion of the isolation layer located between the second recess and the third recess forms a first transmission portion that extends to the second end face in a first direction, and the cover layer covers the waveguide layer and comprises a second transmission portion located on the surface of the first transmission portion and extending to the second end face in the first direction

S5

Etch the substrate base through the plurality of first holes and the plurality of second holes to form the structure of a substrate, wherein the substrate is provided with a first recess that is exposed to its top surface and the second end face, the second recess communicates with the first recess through the plurality of first holes, and the third recess communicates with the first recess through the plurality of second holes

FIG. 5A

SPOT-SIZE CONVERTER, PHOTONIC DEVICE AND METHOD FOR FABRICATING SPOT-SIZE CONVERTER

CROSS REFERENCE TO RELATED APPLICATIONS

This application claims priority to Chinese Patent Application No. 202310108343.9, filed on Feb. 13, 2023, the entire contents of which are hereby incorporated by reference.

TECHNICAL FIELD

The present disclosure relates to the technical field of photons, and in particular, to a spot-size converter, a photonic device, and a method for fabricating a spot-size converter.

BACKGROUND

An optical waveguide is a dielectric apparatus that guides the propagation of light waves therein, and is also referred to as a dielectric optical waveguide. There are mainly two types of optical waveguides: one type is integrated optical waveguides, comprising a planar dielectric optical waveguide and a slab dielectric optical waveguide, which generally serve as a part of an optoelectronic integrated device, so they are referred to as integrated optical waveguides; and the other type is cylindrical optical waveguides, which are usually referred to as optical fibers.

A technology of coupling the integrated optical waveguide to the optical fiber has very wide and important applications in the fields of optical communications, microwave photonics, laser beam deflection, wavefront modulation, etc. Edge coupling is a common way used to couple the integrated optical waveguide to the optical fiber.

However, how to improve the coupling efficiency between the integrated optical waveguide and the optical fiber has always been an important topic under research for those skilled in the art because of the great difference in spot size between the integrated optical waveguide and the optical fiber.

SUMMARY

Embodiments of the present disclosure provide a spot-size converter, a photonic device and a method for fabricating a spot-size converter to improve the coupling efficiency between an integrated optical waveguide and an optical fiber.

According to one aspect of the present disclosure, a spot-size converter is provided. The spot-size converter is provided with a first end face for coupling to an integrated optical waveguide and a second end face for coupling to an optical fiber and parallel to the first end face, the spot-size converter comprising: a substrate, provided with a first recess that is exposed to its top surface and the second end face; an isolation layer, located on the substrate and provided with a second recess and a third recess that are exposed to a top surface of the isolation layer and the second end face, the second recess being provided with a plurality of first holes communicating with the first recess, the third recess being provided with a plurality of second holes communicating with the first recess, and a portion of the isolation layer located between the second recess and the third recess forming a first transmission portion that extends to the second end face in a first direction; a waveguide layer, located on the isolation layer, the width of the waveguide layer decreasing in a direction approaching the second end face, and the waveguide layer comprising a portion that protrudes in the form of a ridge from the surface of the first transmission portion; and a cover layer, located on the waveguide layer and covering the waveguide layer, the cover layer comprising a second transmission portion located on the surface of the first transmission portion and extending to the second end face in the first direction; wherein the first direction is orthogonal to the first end face and the second end face, and the second direction is parallel to the first end face and the second end face and parallel to a bottom surface of the substrate.

In some embodiments, a dimension of the first recess in the second direction is equal to a spacing between a side wall of the second recess and a side wall of the third recess that are away from each other.

In some embodiments, a dimension of the first recess in the second direction is less than a spacing between a side wall of the second recess and a side wall of the third recess that are away from each other, and the first recess is centered in the second direction relative to the side wall of the second recess and the side wall of the third recess that are away from each other.

In some embodiments, a dimension of the second transmission portion in the second direction is equal to a dimension of the first transmission portion in the second direction.

In some embodiments, a dimension of the second transmission portion in the second direction is less than a dimension of the first transmission portion in the second direction, and the second transmission portion is centered in the second direction relative to the first transmission portion.

In some embodiments, a plurality of first supporting members that are arranged at intervals in the first direction and avoid the plurality of first holes are disposed in the second recess, the plurality of first supporting members divide the second recess into a plurality of first sub-recesses, and a first sub-recess of the plurality of first sub-recesses that is close to the second end face is exposed to the second end face; and a plurality of second supporting members that are arranged at intervals in the first direction and avoid the plurality of second holes are disposed in the third recess, the plurality of second supporting members divide the third recess into a plurality of second sub-recesses, and a second sub-recess of the plurality of second sub-recesses that is close to the second end face is exposed to the second end face.

In some embodiments, a dimension of the cover layer in the second direction decreases in the direction approaching the second end face.

In some embodiments, the waveguide layer extends to the second end face; alternatively, a spacing is provided between the second end face and a narrow end of the waveguide layer close to the second end face.

According to one aspect of the present disclosure, a photonic device is provided, comprising a spot-size converter according to any one of the foregoing embodiments.

According to one aspect of the present disclosure, a method for fabricating a spot-size converter is provided, the spot-size converter is provided with a first end face for coupling to an integrated optical waveguide and a second end face for coupling to an optical fiber and parallel to the first end face, and the method comprises:

forming an isolation film layer on a substrate base;

forming a waveguide layer on the isolation film layer, a dimension of the waveguide layer in a second direction decreasing in a direction approaching the second end face, wherein the second direction is parallel to the first end face and the second end face and parallel to a bottom surface of the substrate base;

forming a cover film layer on the isolation film layer and the waveguide layer;

etching the cover film layer and the isolation film layer to form structures of a cover layer and an isolation layer, wherein the isolation layer is provided with a second recess and a third recess that are exposed to its top surface and the second end face; a plurality of first holes are provided at the bottom of the second recess, a plurality of second holes are provided at the bottom of the third recess, a portion of the isolation layer located between the second recess and the third recess forms a first transmission portion that extends to the second end face in a first direction, and the cover layer covers the waveguide layer and comprises a second transmission portion located on the surface of the first transmission portion and extending to the second end face in the first direction, the first direction being orthogonal to the first end face and the second end face; and etching the substrate base through the plurality of first holes and the plurality of second holes to form a structure of a substrate, wherein the substrate is provided with a first recess that is exposed to its top surface and the second end face, the second recess communicates with the first recess through the plurality of first holes, and the third recess communicates with the first recess through the plurality of second holes.

In some embodiments, that etching the cover film layer and the isolation film layer to form the structures of a cover layer and an isolation layer comprises:

etching the cover film layer and the isolation film layer to form a plurality of first sub-recesses arranged at intervals in the first direction and a plurality of second sub-recesses that are arranged at intervals in the first direction and disposed side by side with the plurality of first sub-recesses in the second direction, wherein a first supporting member is formed between adjacent first sub-recesses, and a second supporting member is formed between adjacent second sub-recesses; and etching to form a plurality of first holes at bottoms of the plurality of first sub-recesses and etching to form a plurality of second holes at bottoms of the plurality of second sub-recesses.

By the structural design or fabrication method for the spot-size converter, the coupling efficiency between the integrated optical waveguide and the optical fiber can be improved, the optical loss in spot-size conversion can be reduced, the structural reliability of the spot-size converter can also be improved, and the fabrication process is simple and feasible.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

More details, features, and advantages of the present disclosure are disclosed in the following description of exemplary embodiments with reference to the accompany drawings, in which:

FIG. 5A is a schematic flowchart of a method for fabricating a spot-size converter according to some exemplary embodiments of the present disclosure;

DETAILED DESCRIPTION

Only some exemplary embodiments are briefly described below. As can be appreciated by those skilled in the art, the described embodiments can be modified in various ways without departing from the spirit or scope of the present disclosure. Accordingly, the accompanying drawings and the description are considered as illustrative in nature, and not as restrictive.

Although the existing spot-size converters can functionally realize the coupling between an integrated optical waveguide and an optical fiber, the coupling efficiency between the integrated optical waveguide and the optical fiber is not high because of the large difference in spot size therebetween, resulting in a high loss of light energy. For example, the spot size of the integrated optical waveguide is generally of the order of hundreds of nanometers, while the spot size of the optical fiber, such as a flat-ended optical fiber, is of the order of tens of microns. Lost light energy may lead to severe heating of a coupling end face, thereby affecting the reliability and service life of a device. It can be understood that the coupling efficiency is a ratio of optical power emitted by the integrated optical waveguide to optical power received by the optical fiber, or a ratio of optical power emitted by the optical fiber to optical power received by the integrated optical waveguide.

Embodiments of the present disclosure provide a spot-size converter, a photonic device and a method for fabricating a spot-size converter to improve the coupling efficiency between an integrated optical waveguide and an optical fiber and reduce the optical loss in spot-size conversion.

Figure 1:
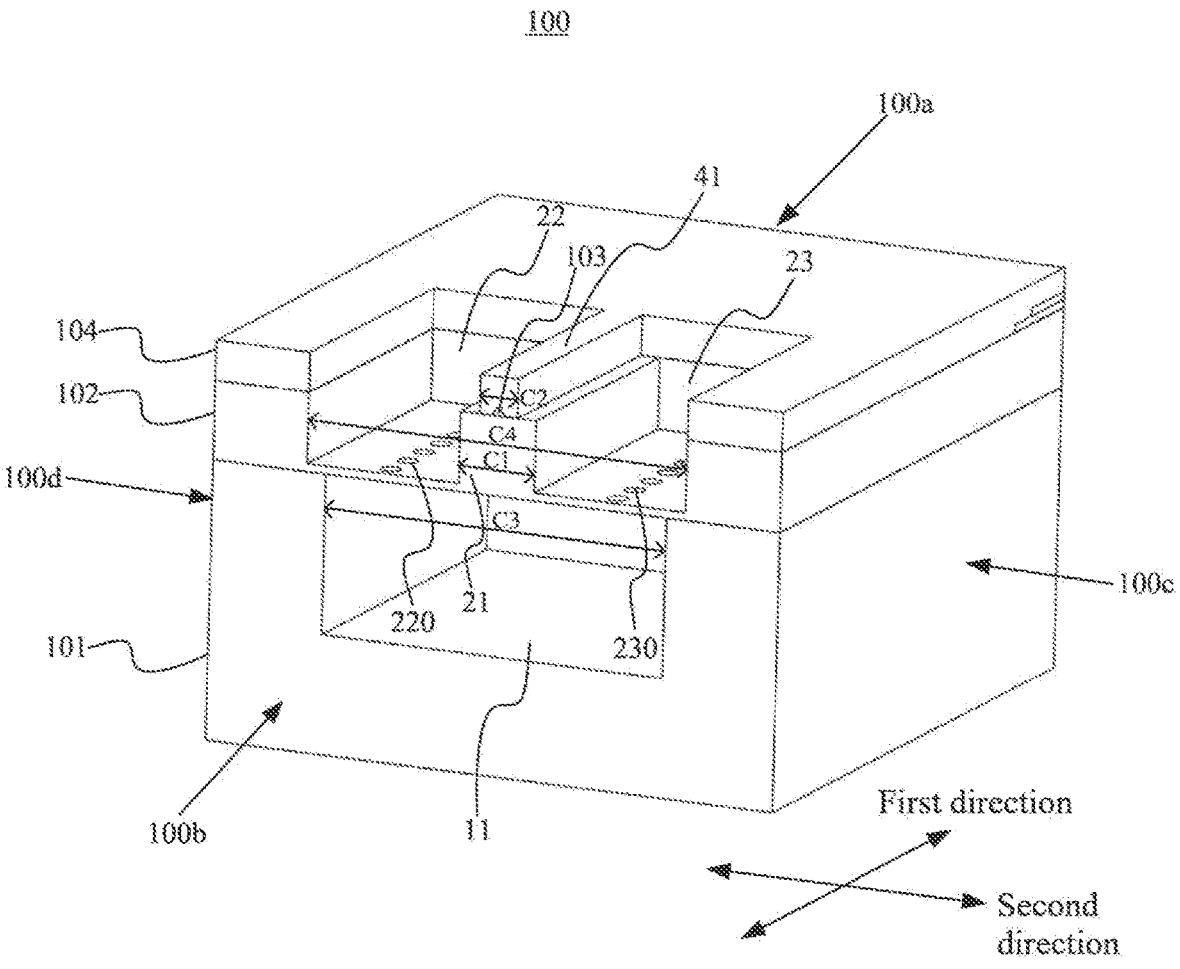
FIG. 1 is a schematic structural perspective view of a spot-size converter according to some exemplary embodiments of the present disclosure.
Figure 2:
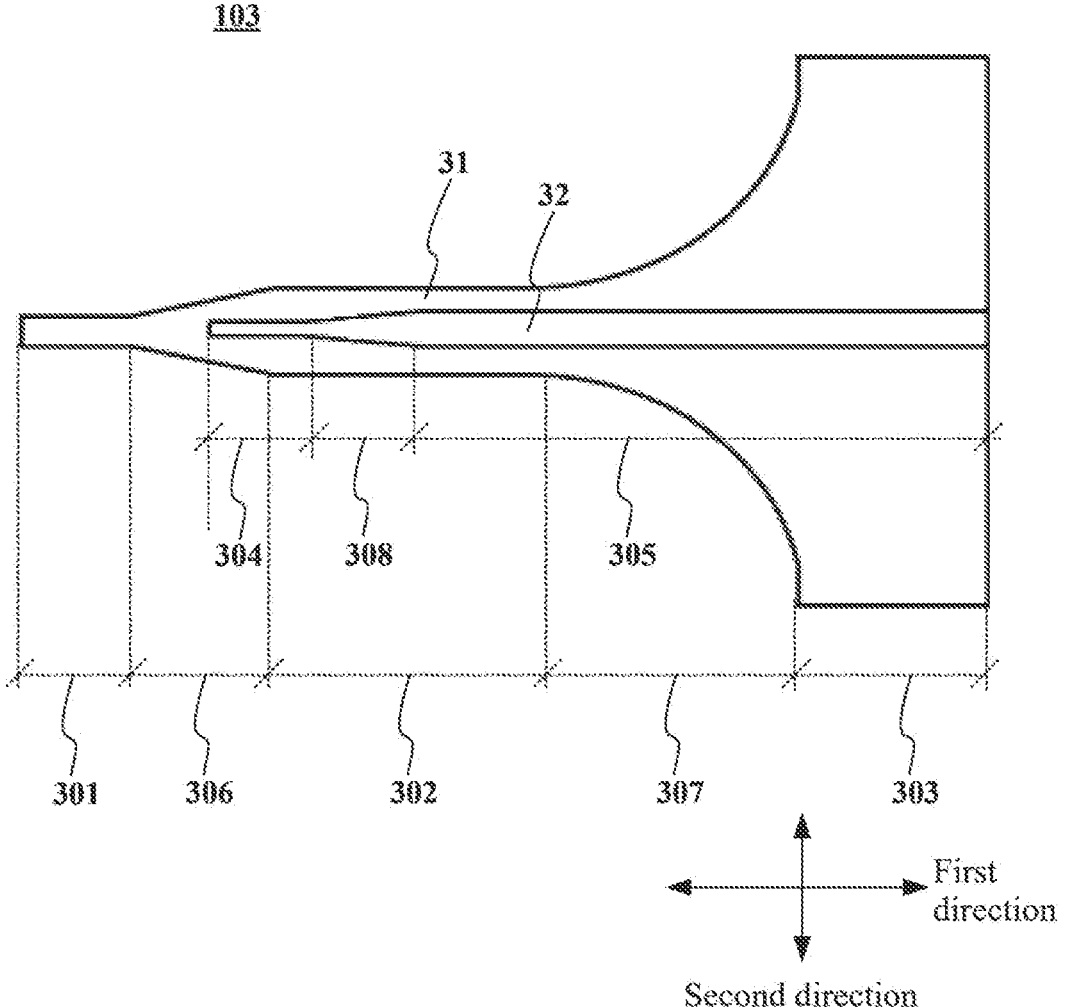
FIG. 2 is a schematic structural top view of a waveguide layer of a spot-size converter according to some exemplary embodiments of the present disclosure.

As shown in FIG. 1 and FIG. 2, a spot-size converter 100 provided in some embodiments of the present disclosure is provided with a first end face 100a for coupling with an integrated optical waveguide (not shown in the figures) and a second end face 100b for coupling with an optical fiber (not shown in the figures) and parallel to the first end face 100a. The spot-size converter 100 comprises a substrate 101, an isolation layer 102, a waveguide layer 103 and a cover layer 104 that are arranged in sequence. The substrate 101 is provided with a first recess 11 that is exposed to its top surface and the second end face 100b. The isolation layer 102 is located on the substrate 101 and provided with a second recess 22 and a third recess 23 that are exposed to its top surface and the second end face 100b. The second recess 22 is provided with a plurality of first holes 220 communicating with the first recess 11. The third recess 23 is provided with a plurality of second holes 230 communicating with the first recess 11. A portion of the isolation layer 102 located between the second recess 22 and the third recess 23 forms a first transmission portion 21 that extends to the second end face 100b in a first direction. The waveguide layer 103 is located on the isolation layer 102, a dimension of the waveguide layer in a second direction decreases in a direction approaching the second end face 100b (as shown in FIG. 2). The waveguide layer 103 comprises a portion that protrudes in the form of a ridge from the surface of the first transmission portion 21. The cover layer 104 is located on the waveguide layer 103 and covers the waveguide layer 103. The cover layer 104 comprises a second transmission portion 41 located on the surface of the first transmission portion 21 and extending to the second end face 100b in the first direction. In an embodiment of the present disclosure, the first direction is orthogonal to the first end face 100a and the second end face 100b, and the second direction is orthogonal to the first direction (i.e., parallel to the first end face 100a and the second end face 100b) and parallel to a bottom surface of the substrate 101.

In an embodiment of the present disclosure, referring to FIG. 1, a surface of a side of the substrate 101 away from the isolation layer 102 is defined as the bottom surface of the substrate, and a surface of a side thereof close to the isolation layer 102 is defined as the top surface of the substrate. This can be used as an orientation reference. A side of a specific layer structure further away from the bottom surface of the substrate 101 is defined as the upper side of the layer structure, and a side thereof closer to the bottom surface of the substrate 101 is defined as the lower side of the layer structure. It should be noted that in the embodiments of the present disclosure, the definitions of top, bottom, upper, lower and the like do not refer to an absolute orientation, for example, in practice, the bottom surface of the substrate 101 does not need to be parallel to the horizontal plane, but may be at any angle to the horizontal plane.

In an embodiment of the present disclosure, a direction orthogonal to the first end face 100a and the second end face 100b is defined as the first direction, which is also a main transmission direction of light in the waveguide layer 103, and the second direction is parallel to the first end face 100a and the second end face 100b (orthogonal to the first direction) and parallel to the bottom surface of the substrate 101. The dimension in the second direction refers to the width mentioned below.

As shown in FIG. 1, in addition to comprising the first end face 100a and the second end face 100b, the spot-size converter 100 further comprises a first side surface 100c and a second side surface 100d that intersect with the first end face 100a and the second end face 100b. In an embodiment, the first side surface 100c and the second side surface 100d are orthogonal to the first end face 100a and the second end face 100b, but the embodiments of the present disclosure are not limited thereto.

It is possible that the first end face 100a of the spot-size converter 100 serves as an end face of an optical input side of the spot-size converter 100, and the second end face 100b serves as an end face of an optical output side of the spot-size converter 100. Light enters the spot-size converter 100 from a wide end of the waveguide layer 103 on the first end face 100a, and is outputted from ends of the first transmission portion 21 and the second transmission portion 41 on the second end face 100b. It is also possible that the first end face 100a of the spot-size converter 100 serves as the end face of the optical output side of the spot-size converter 100, and the second end face 100b serves as the end face of the optical input side of the spot-size converter 100. Light enters the spot-size converter 100 from the ends of the first transmission portion 21 and the second transmission portion 41 on the second end face 100b, and is outputted from the wide end of the waveguide layer 103 under the guidance of the waveguide layer 103.

A dimension of the waveguide layer 103 in the second direction decreases in a gradient manner in the direction approaching the second end face 100b, such that relatively moderate spot-size modulation can be performed on the light transmitted in the waveguide layer 103, thereby minimizing the light transmission loss and improving the coupling efficiency of the spot-size converter 100. The expression "a dimension of the waveguide layer 103 in the second direction decreases in a gradient manner in the direction approaching the second end face 100b" can be understood as that the dimension (i.e., width) of the waveguide layer 103 in the second direction can be roughly divided into at least two portions according to the change rule of the dimension, and each portion can use a design of constant width or a design of gradually-changing width. Furthermore, the closer the portion of the waveguide layer is to the second end face 100b, the smaller is the average value of the width thereof.

In other embodiments of the present disclosure, the dimension of the waveguide layer in the second direction may also decrease gradually in the direction approaching the second end face 100b, such that for any two positions of the waveguide layer in the first direction, the position closer to the second end face 100b has a smaller width.

The first transmission portion 21 and the second transmission portion 41 are located between the second recess 22 and the third recess 23 and above the first recess 11. In this way, the first recess 11, the second recess 22, and the third recess 23 have a blocking effect on the diffusion of an optical mode field in the second direction, so that light can be confined to propagate more concentratedly within the first transmission portion 21, the second transmission portion 41 and the waveguide layer 103, which is also conducive to reducing the light transmission loss and improving the coupling efficiency of the spot-size converter 100.

Therefore, the structural design of the spot-size converter 100 in the embodiments of the present disclosure can improve the coupling efficiency between the integrated optical waveguide and the optical fiber and reduce the optical loss in spot-size conversion.

Micro-nano machining technologies are generally used in the fabrication of spot-size converters. Micro-nano machining refers to technologies for the optimal design, machining, assembling, system integration and application of elements at sub-millimeter, micrometer, and nanometer scales, as well as components or systems composed of these elements. In an embodiment of the present disclosure, the spot-size converter 100 is fabricated by sequentially forming an isolation film layer (unpatterned), the waveguide layer 103 (patterned), and a cover film layer (unpatterned) on a substrate base (unpatterned); then etching from top to bottom to remove a part of the cover film layer and a part of the isolation film layer to form the patterned cover layer 104 and isolation layer 102, i.e., to form the second recess 22, the third recess 23, the plurality of first holes 220 and the plurality of second holes 230; and then introducing an etching gas (e.g., plasma gas) to pass through the plurality of first holes 220 and the plurality of second holes 230 to etch the substrate base to form the substrate 101 provided with the first recess 11. Thus, with the design in the embodiments of the present disclosure, the micro-nano machining process for the spot-size converter 100 is simple and feasible.

In an embodiment of the present disclosure, the second recess 22 and the third recess 23 are spaced apart from the first recess 11 by a portion of the isolation layer 102, and this portion is in the shape of a flat plate and has a certain thickness, so that, on the one hand, etching of the first recess 11 can be realized through the plurality of first holes 220 and the plurality of second holes 230 as described above, and on the other hand, the structure of the spot-size converter 100 can be reinforced, making the overall structure of the spot-size converter 100 more reliable and improving the resistance to mechanical impact.

Therefore, compared to the related technologies, the design of the spot-size converter 100 in the embodiments of the present disclosure can not only improve the coupling efficiency between the integrated optical waveguide and the optical fiber and reduce the optical loss in spot-size conversion, and also improve the structural reliability of the spot-size converter 100, and make the fabrication process simple and feasible.

As shown in FIG. 2, the waveguide layer 103 may use a ridge waveguide, comprising a flat plate layer 31 and a ridge layer 32 located on one side of the flat plate layer 31 away from the substrate 101. The ridge waveguide has properties such as a low dominant mode cutoff frequency, wide bandwidth, and low impedance. In some embodiments of the present disclosure, the refractive index n1 of the waveguide layer 103, the refractive index n2 of the cover layer 104 and the refractive index n3 of the isolation layer 102 satisfy: n1>n2, and n1>n3. The refractive index of the isolation layer 102 and the refractive index of the cover layer 104 are less than that of the waveguide layer 103, so that light can be mainly confined to transmitting in the ridge waveguide to better achieve the above advantages of the ridge waveguide.

In other embodiments of the present disclosure, the waveguide layer 103 may comprise only the ridge layer 32 described above, but does not comprise the flat plate layer 31 described above.

The specific structural form of the waveguide layer 103 is not limited. As shown in FIG. 2, in some embodiments, the flat plate layer 31 of the waveguide layer 103 comprises a first constant-width portion 301, a first gradually-widening portion 306, a second constant-width portion 302, a second gradually-widening portion 307 and a third constant-width portion 303 that are arranged in sequence in a direction away from the second end face 100b; and the ridge layer 32 comprises a fourth constant-width portion 304, a third gradually-widening portion 308 and a fifth constant-width portion 305 that are arranged in sequence in the direction away from the second end face 100b. The width of each of the constant-width portions is constant everywhere, and the width of each of the gradually-widening portions increases gradually in a linear or non-linear manner in the direction away from the second end face 100b.

In the embodiment shown in FIG. 1, the waveguide layer 103 extends to the second end face 100b. In some other embodiments of the present disclosure, there may also be a spacing between the second end face 100b and a narrow end of the waveguide layer close to the second end face 100b. In addition, as shown in FIG. 2, there may also be a spacing between a narrow end of the ridge layer 32 and a narrow end of the flat plate layer 31.

As shown in FIG. 1, in some embodiments of the present disclosure, the dimension C2 of the second transmission portion 41 in the second direction is less than the dimension C1 of the first transmission portion 21 in the second direction, that is, the second transmission portion 41 protrudes in the form of a ridge from the surface of the first transmission portion 21. In such a way, there is a sinking modulation effect on the optical mode field so that it can be sunk more into the isolation layer 102, such that the size of a spot formed at the second end face 100b basically matches the spot size of the optical fiber, thereby reducing the optical loss in spot-size conversion and improving the coupling efficiency.

Figure 3:
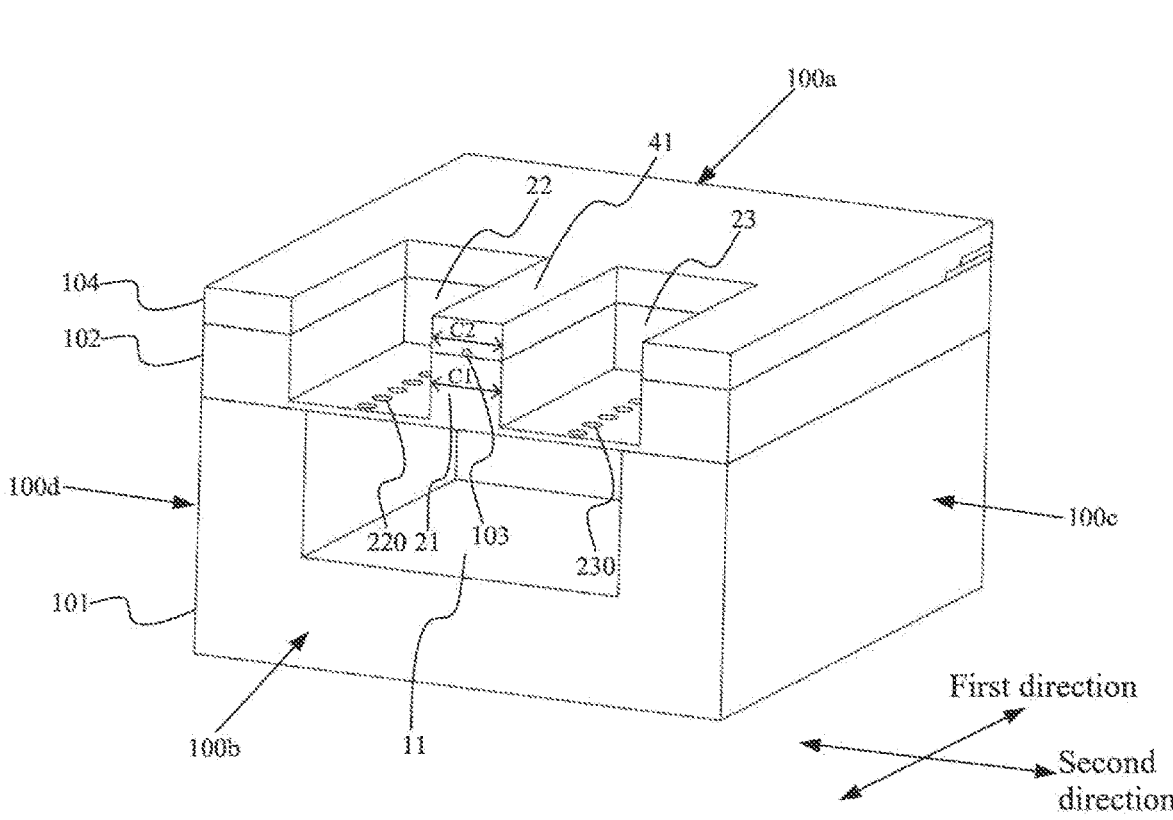
FIG. 3 is a schematic structural perspective view of a spot-size converter according to some other exemplary embodiments of the present disclosure.

As shown in FIG. 3, in some other embodiments of the present disclosure, the dimension C2 of the second transmission portion 41 in the second direction may also be equal to the dimension C1 of the first transmission portion 21 in the second direction. This simplifies the etching process and reduces machining difficulty, making the fabrication process easier to control to achieve a higher fabrication accuracy.

In some embodiments of the present disclosure, a dimension of the first recess in the second direction is equal to a spacing between a side wall of the second recess and a side wall of the third recess that are away from each other. That is, orthographic projections, on the bottom surface of the substrate, of the side wall of the second recess and the side wall of the third recess that are away from each other substantially coincide with orthographic projections, on the bottom surface of the substrate, of two side walls of the first recess. Such a design can not only meet the requirements for the coupling efficiency of the spot-size converter, but also improve supporting performance of the substrate to the upper structure, thereby further improving the structural reliability and the resistance to mechanical impact.

As shown in FIG. 1, in some other embodiments of the present disclosure, the dimension C3 of the first recess 11 in the second direction is less than the spacing C4 between a side wall of the second recess 22 and a side wall of the third recess 23 that are away from each other, and the first recess 11 is centered in the second direction relative to the side wall of the second recess 22 and the side wall of the third recess 23 that are away from each other. That is, the orthographic projections, on the bottom surface of the substrate 101, of the two side walls of the first recess 11 are located between and centered between the orthographic projections, on the bottom surface of the substrate 101, of the side wall of the second recess 22 and the side wall of the third recess 23 that are away from each other.

Compared to the foregoing embodiments, with other parameters remaining unchanged, this embodiment can further increase the supporting performance of the substrate 101 to the upper structure by designing the dimension of the first recess 11 in the second direction to be smaller, thus making the structure of the spot-size converter 100 more reliable and further improving the resistance to mechanical impact. In addition, the first recess 11 is centered relative to the side wall of the second recess 22 and the side wall of the third recess 23 that are away from each other, making the structural force of the spot-size converter 100 and the effect on optical transmission more balanced, and also making the structural design and fabrication process simpler and more feasible.

Figure 4:
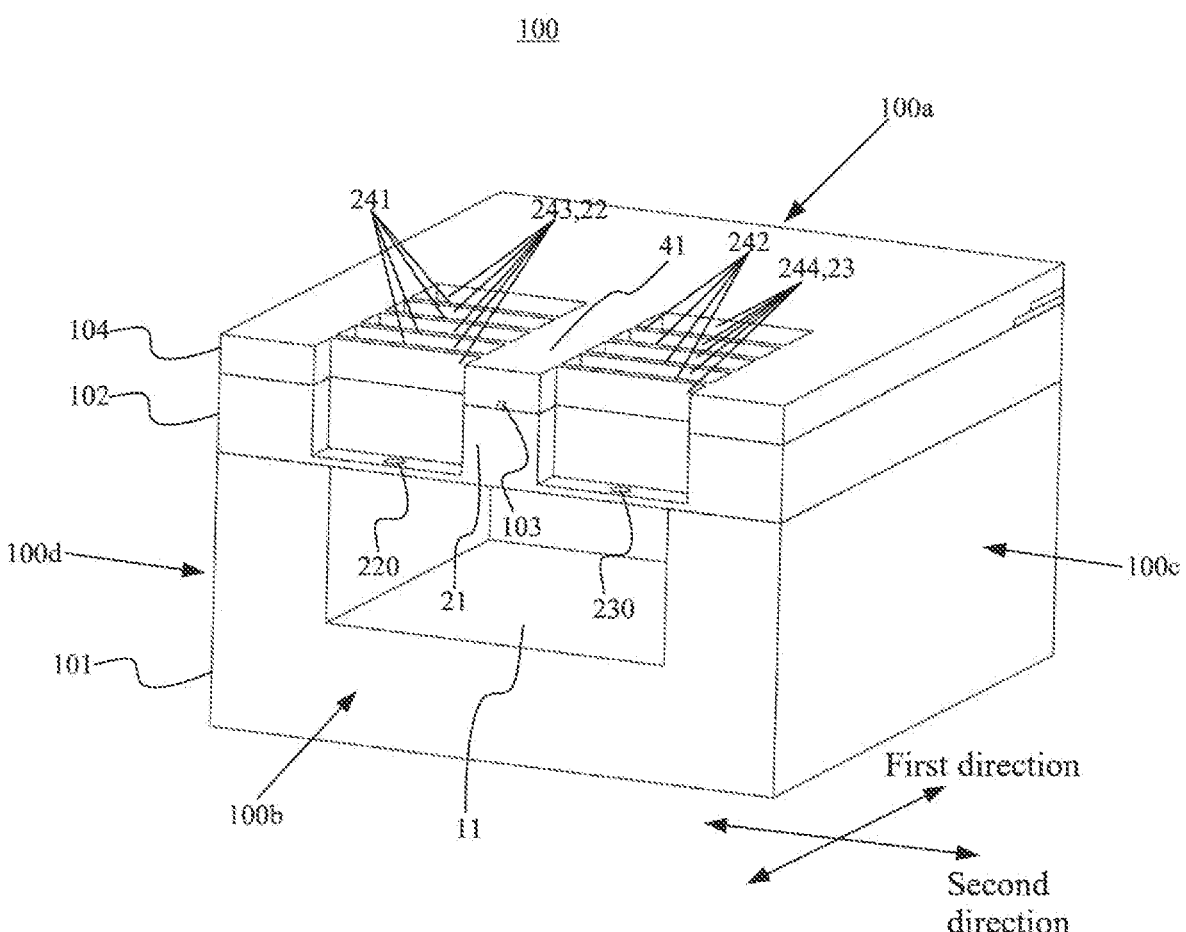
FIG. 4 is a schematic structural perspective view of a spot-size converter according to still some other exemplary embodiments of the present disclosure.

As shown in FIG. 4, in some embodiments of the present disclosure, a plurality of first supporting members 241 that are arranged at intervals in the first direction and avoid the plurality of first holes 220 are disposed in the second recess 22, the plurality of first supporting members 241 divide the second recess 22 into a plurality of first sub-recesses 243, and the first sub-recess 243 close to the second end face 100*b* is exposed to the second end face 100*b*; and a plurality of second supporting members 242 that are arranged at intervals in the first direction and avoid the plurality of second holes 230 are disposed in the third recess 23, the plurality of second supporting members 242 divide the third recess 23 into a plurality of second sub-recesses 244, and the second sub-recess 244 close to the second end face 100*b* is exposed to the second end face 100*b*.

After the isolation film layer (unpatterned), the waveguide layer 103 (patterned), and the cover film layer (unpatterned) are formed sequentially on the substrate base (unpatterned), the cover film layer and the isolation film layer may be etched to form the plurality of first sub-recesses 243 arranged at intervals in the first direction and the plurality of second sub-recesses 244 arranged at intervals in the first direction. A first supporting member 241 is disposed between adjacent first sub-recesses 243, and a second supporting member 242 is disposed between adjacent second sub-recesses 244. The first supporting member 241 and the second supporting member 242 may further improve the structural reliability and resistance to mechanical impact of the spot-size converter 100, and reduce the probability of a device being damaged by other structures during transportation or assembly. The specific number of the first supporting members 241 and the second supporting members 242 is not limited, and can be determined in conjunction with the specific structural form, material, and specifications and dimensions of the spot-size converter 100.

As shown in FIGS. 1, 3, and 4, in these embodiments of the present disclosure, the cover layer 104 extends to the first side surface 100*c* and the second side surface 100*d*, with the overall width unchanged.

In some embodiments of the present disclosure, the dimension of the cover layer as a whole in the second direction may also decrease in the direction approaching the second end face 100*b* (not illustrated in the figures). In this way, more light can be guided into the waveguide layer 103 and the second transmission portion 41, thereby further improving the coupling efficiency of the spot-size converter 100.

Figure 5B:
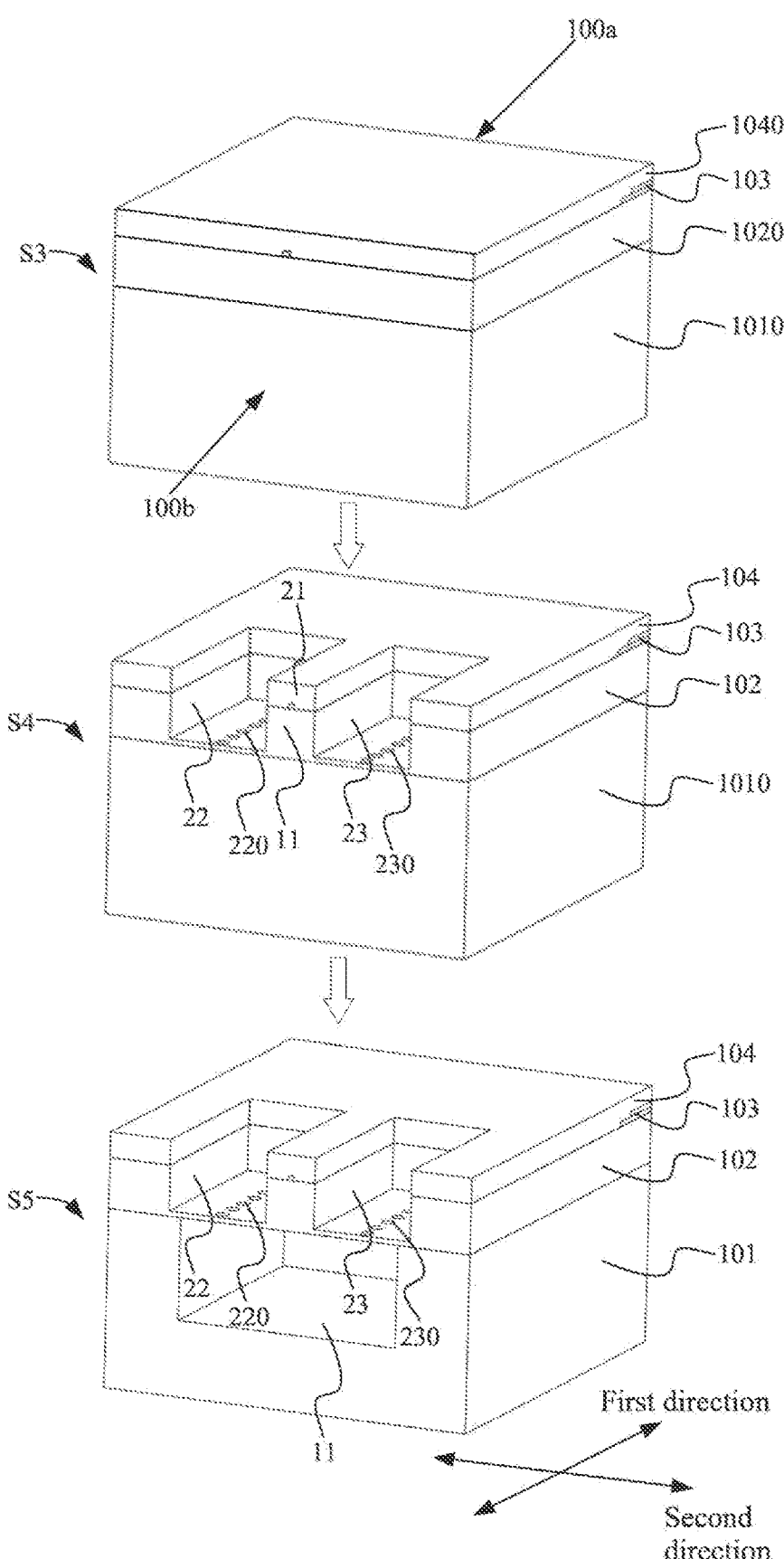
FIG. 5B is a schematic diagram of some steps of a f method for fabricating a spot-size converter according to some exemplary embodiments of the present disclosure.

As shown in FIGS. 5A and 5B, some embodiments of the present disclosure further provide a method 500 for fabricating a spot-size converter. The spot-size converter may be the spot-size converter 100 of any of the foregoing embodiments. The fabrication method includes steps S1 to S5 as below.

In step S1, an isolation film layer 1020 is formed on a substrate base 1010.

In step S2, a waveguide layer 103 is formed on the isolation film layer 1020, a dimension of the waveguide layer 103 in a second direction decreasing in a direction approaching the second end face 100*b*, wherein the second direction is parallel to the first end face 100*a* and the second end face 100*b* and parallel to a bottom surface of the substrate base 1010.

In step S3, a cover film layer 1040 is formed on the isolation film layer 1020 and the waveguide layer 103.

In step S4, the cover film layer 1040 and the isolation film layer 1020 are etched to form the structures of a cover layer 104 and an isolation layer 102.

In the structures of the cover layer 104 and the isolation layer 102 that is formed in this step, the isolation layer 102 is provided with a second recess 22 and a third recess 23 that are exposed to its top surface and the second end face 100*b*, a plurality of first holes 220 are provided at the bottom of the second recess 22, a plurality of second holes 230 are provided at the bottom of the third recess 23, a portion of the isolation layer 102 located between the second recess 22 and the third recess 23 forms a first transmission portion 21 that extends to the second end face 100*b* in a first direction, and the cover layer 104 covers the waveguide layer 103 and comprises a second transmission portion 41 located on the surface of the first transmission portion 21 and extending to the second end face 100*b* in the first direction, wherein the first direction is orthogonal to the first end face 100*a* and the second end face 100*b*.

In step S5, the substrate base 1010 is etched through the plurality of first holes 220 and the plurality of second holes 230 to form the structure of a substrate 101, wherein the substrate 101 is provided with a first recess 11 that is exposed to its top surface and the second end face 100*b*, the second recess 22 communicates with the first recess 11 through the plurality of first holes 220, and the third recess 23 communicates with the first recess 11 through the plurality of second holes 230.

Compared to the related technologies, the spot-size converter fabricated by the method in the embodiments of the present disclosure can improve the coupling efficiency between the integrated optical waveguide and the optical fiber and reduce the optical loss in spot-size conversion, and besides, the structural reliability of the spot-size converter can also be improved and the fabrication process is simple and feasible.

Figure 6:
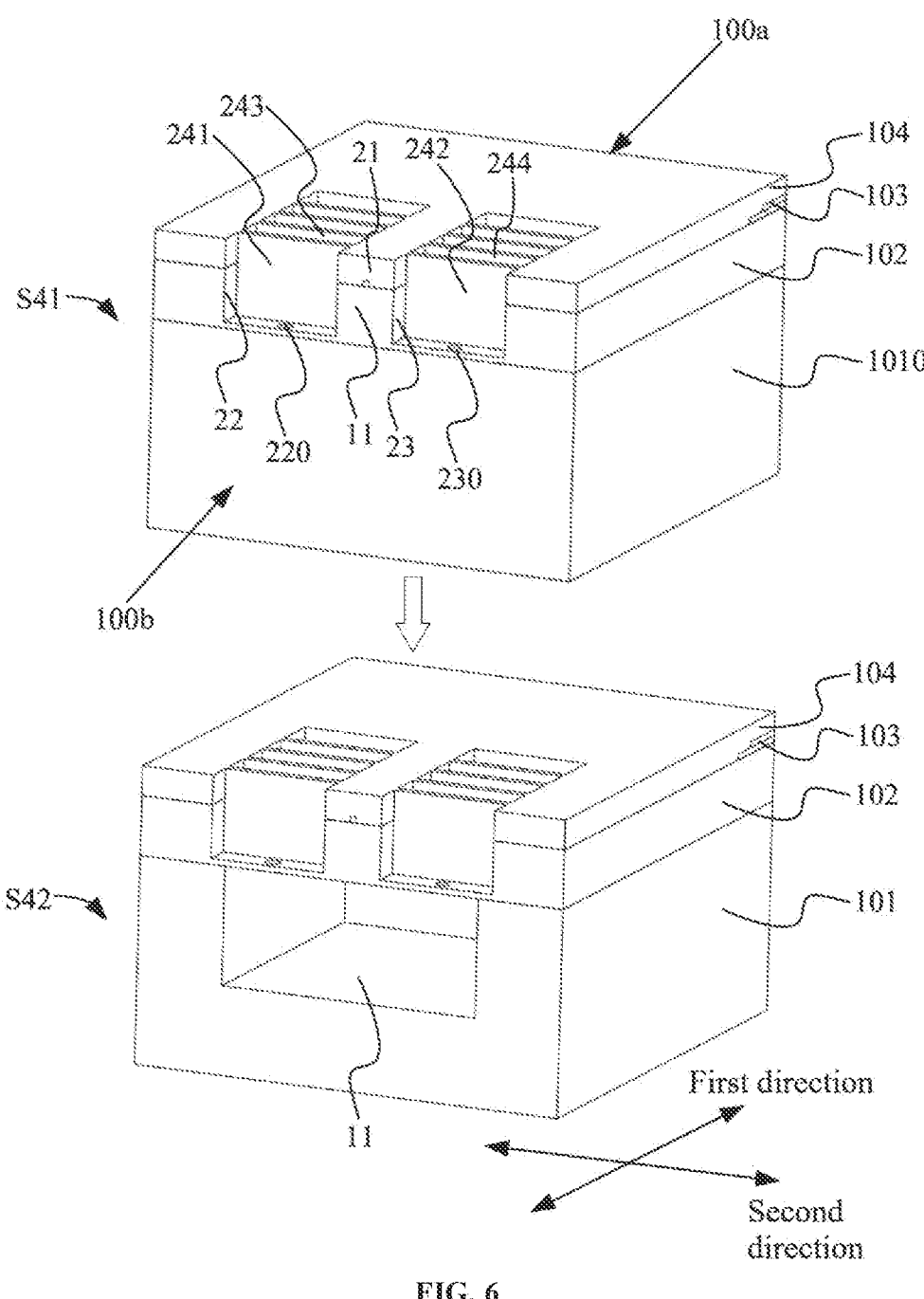
FIG. 6 is a schematic diagram of some steps of a method for fabricating a spot-size converter according to some exemplary embodiments of the present disclosure.

As shown in FIG. 6, in some embodiments, step S4 may include sub-steps S41 and S42 as below.

In sub-step S41, the cover film layer 1040 and the isolation film layer 1020 are etched to form a plurality of first sub-recesses 243 arranged at intervals in the first direction and a plurality of second sub-recesses 244 that are arranged at intervals in the first direction and disposed side by side with the plurality of first sub-recesses 243 in the second direction, a first supporting member 241 is formed between adjacent first sub-recesses 243, and a second supporting member 242 is formed between adjacent second sub-recesses 244; and in sub-step S42, a plurality of first holes 220 are formed by etching at the bottoms of the plurality of first sub-recesses 243, and a plurality of second holes 230 are formed by etching at the bottoms of the plurality of second sub-recesses 244.

The spot-size converter fabricated by the method in this embodiment is provided with a plurality of first supporting members 241 and a plurality of second supporting members 242, such that the structural reliability and resistance to mechanical impact of the spot-size converter can be further improved, and the possibility of a device being damaged by other structures during transportation or assembly can be reduced.

Figure 7:
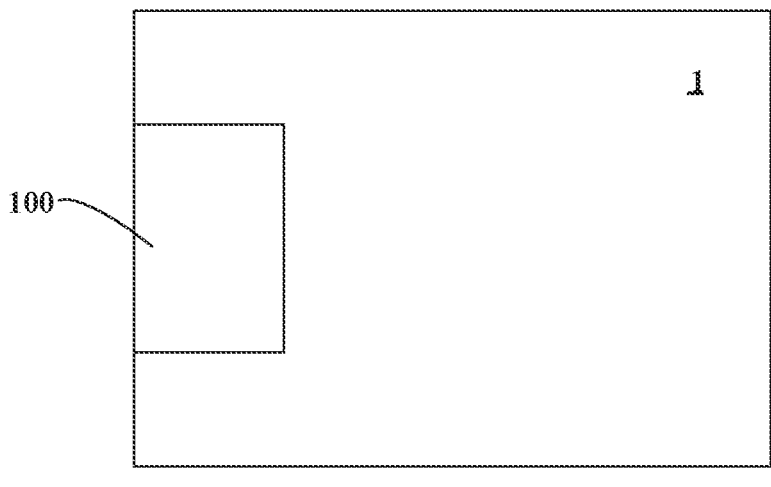
FIG. 7 is a structural block diagram of a photonic device according to some exemplary embodiments of the present disclosure.

As shown in FIG. 7, an embodiment of the present disclosure further provides a photonic device 1, comprising the spot-size converter 100 according to any one of the aforementioned embodiments. The specific product type of the photonic device 1 is not limited, for example, it may be an electro-optical modulator, a splitter, a star coupler, a variable optical attenuator (VOA), an optical switch, a frequency comb, an array waveguide grating (AWG), and the like.

The spot-size converter 100 is integrated in the photonic device 1. Since the spot-size converter 100 has a higher coupling efficiency, the photonic device 1 has smaller optical loss and improved performance. Moreover, the reliability of the photonic device 1 is improved due to the improving of structural reliability of the spot-size converter 100.

It should be understood that, in this description, the orientations or positional relationships or dimensions denoted by the terms, such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "circumferential", are the orientations or positional relationships or dimensions shown on the basis of the accompanying drawings, and these terms are used merely for ease of description, rather than indicating or implying that the device or element referred to must have particular orientations and be constructed and operated in the particular orientations, and therefore should not be construed as limiting the scope of protection of the present disclosure.

In addition, the terms such as "first", "second" and "third" are merely for descriptive purposes and should not be construed as indicating or implying relative importance or implicitly indicating the number of technical features indicated. Thus, the features defined with "first", "second" and "third" may explicitly or implicitly include one or more features. In the description of the present disclosure, the term "a plurality of" means two or more, unless otherwise explicitly and specifically defined.

In the present disclosure, unless expressly stated or defined otherwise, the terms such as "mounting", "connection", "connected" and "fixing" should be interpreted broadly, for example, they may be a fixed connection, a detachable connection, or an integrated connection; may be mechanical connection, or electrical connection, or communication; and may be a direct connection or an indirect connection by means of an intermediate medium, or may be internal communication between two elements or interaction between the two elements. For those of ordinary skill in the art, the specific meanings of the above terms in the present disclosure can be understood according to specific circumstances.

In the present disclosure, unless expressly stated or defined otherwise, the expression of the first feature being "above" or "below" the second feature may include the case that the first feature is in direct contact with the second feature, or the case that the first feature and the second feature are not in direct contact but are contacted via another feature therebetween. Furthermore, the first feature being "over", "above" or "on" the second feature includes the case that the first feature is directly or obliquely above the second feature, or merely indicates that the first feature is at a higher level than the second feature. The first feature being "below", "under" or "beneath" the second feature includes the case that the first feature is directly or obliquely below the second feature, or merely indicates that the first feature is at a lower level than the second feature.

This description provides many different implementations or examples that can be used to implement the present disclosure. It should be understood that these different implementations or examples are purely illustrative and are not intended to limit the scope of protection of the present disclosure in any way. On the basis of the disclosure of the description of the present disclosure, those skilled in the art will be able to conceive of various changes or substitutions. All these changes or substitutions shall fall within the scope of protection of the present disclosure. Therefore, the scope of protection of the present disclosure shall be subject to the scope of protection of the claims.

What is claimed is:

1. A spot-size converter, provided with a first end face for coupling to an integrated optical waveguide and a second end face for coupling to an optical fiber, wherein the second end face is parallel to the first end face, the spot-size converter comprising:
   a substrate, provided with a first recess that is exposed to its top surface and the second end face;
   an isolation layer, located on the substrate and provided with a second recess and a third recess that are exposed to a top surface of the isolation layer and the second end face, the second recess being provided with a plurality of first holes communicating with the first recess, the third recess being provided with a plurality of second holes communicating with the first recess, and a portion of the isolation layer located between the second recess and the third recess forming a first transmission portion that extends to the second end face in a first direction, wherein the first direction is orthogonal to the first end face and the second end face;
   a waveguide layer, located on the isolation layer, a dimension of the waveguide layer in a second direction decreasing in a direction approaching the second end face, and the waveguide layer comprising a portion that protrudes in the form of a ridge from a surface of the first transmission portion, wherein the second direction is orthogonal to the first direction and parallel to a bottom surface of the substrate; and
   a cover layer, located on the waveguide layer and covering the waveguide layer, the cover layer comprising a second transmission portion located on the surface of the first transmission portion and extending to the second end face in the first direction.

2. The spot-size converter according to claim 1, wherein a dimension of the first recess in the second direction is equal to a spacing between a side wall of the second recess and a side wall of the third recess that are away from each other.

3. The spot-size converter according to claim 1, wherein a dimension of the first recess in the second direction is less than a spacing between a side wall of the second recess and a side wall of the third recess that are away from each other, and the first recess is centered in the second direction relative to the side wall of the second recess and the side wall of the third recess that are away from each other.

4. The spot-size converter according to claim 1, wherein a dimension of the second transmission portion in the second direction is equal to a dimension of the first transmission portion in the second direction.

5. The spot-size converter according to claim 1, wherein a dimension of the second transmission portion in the second direction is less than a dimension of the first transmission portion in the second direction, and the second transmission portion is centered in the second direction relative to the first transmission portion.

6. The spot-size converter according to claim 1, wherein a plurality of first supporting members that are arranged at intervals in the first direction and avoid the plurality of first holes are disposed in the second recess, the plurality of first supporting members dividing the second recess into a plurality of first sub-recesses, and a first sub-recess of the plurality of first sub-recesses that is close to the second end face being exposed to the second end face; and
   a plurality of second supporting members that are arranged at intervals in the first direction and avoid the plurality of second holes are disposed in the third recess, the plurality of second supporting members dividing the third recess into a plurality of second sub-recesses, and a second sub-recess of the plurality of second sub-recesses that is close to the second end face being exposed to the second end face.

7. The spot-size converter according to claim 1, wherein a dimension of the cover layer in the second direction decreases in the direction approaching the second end face.

8. The spot-size converter according to claim 1, wherein the waveguide layer extends to the second end face; or a spacing is provided between the second end face and a narrow end of the waveguide layer close to the second end face.

9. A photonic device, comprising a spot-size converter, wherein the spot-size converter is provided with a first end face for coupling to an integrated optical waveguide and a second end face for coupling to an optical fiber, wherein the second end face is parallel to the first end face, the spot-size converter comprising:

a substrate, provided with a first recess that is exposed to its top surface and the second end face;

an isolation layer, located on the substrate and provided with a second recess and a third recess that are exposed to a top surface of the isolation layer and the second end face, the second recess being provided with a plurality of first holes communicating with the first recess, the third recess being provided with a plurality of second holes communicating with the first recess, and a portion of the isolation layer located between the second recess and the third recess forming a first transmission portion that extends to the second end face in a first direction, wherein the first direction is orthogonal to the first end face and the second end face;

a waveguide layer, located on the isolation layer, a dimension of the waveguide layer in a second direction decreasing in a direction approaching the second end face, and the waveguide layer comprising a portion that protrudes in the form of a ridge from a surface of the first transmission portion, wherein the second direction is orthogonal to the first direction and parallel to a bottom surface of the substrate; and a cover layer, located on the waveguide layer and covering the waveguide layer, the cover layer comprising a second transmission portion located on the surface of the first transmission portion and extending to the second end face in the first direction.

10. The photonic device according to claim 9, wherein a dimension of the first recess in the second direction is equal to a spacing between a side wall of the second recess and a side wall of the third recess that are away from each other.

11. The photonic device according to claim 9, wherein a dimension of the first recess in the second direction is less than a spacing between a side wall of the second recess and a side wall of the third recess that are away from each other, and the first recess is centered in the second direction relative to the side wall of the second recess and the side wall of the third recess that are away from each other.

12. The photonic device according to claim 9, wherein a dimension of the second transmission portion in the second direction is equal to a dimension of the first transmission portion in the second direction.

13. The photonic device according to claim 9, wherein a dimension of the second transmission portion in the second direction is less than a dimension of the first transmission portion in the second direction, and the second transmission portion is centered in the second direction relative to the first transmission portion.

14. The photonic device according to claim 9, wherein a plurality of first supporting members that are arranged at intervals in the first direction and avoid the plurality of first holes are disposed in the second recess, the plurality of first supporting members dividing the second recess into a plurality of first sub-recesses, and a first sub-recess of the plurality of first sub-recesses that is close to the second end face being exposed to the second end face; and a plurality of second supporting members that are arranged at intervals in the first direction and avoid the plurality of second holes are disposed in the third recess, the plurality of second supporting members dividing the third recess into a plurality of second sub-recesses, and a second sub-recess of the plurality of second sub-recesses that is close to the second end face being exposed to the second end face.

15. The photonic device according to claim 9, wherein a dimension of the cover layer in the second direction decreases in the direction approaching the second end face.

16. The photonic device according to claim 9, wherein the waveguide layer extends to the second end face; or a spacing is provided between the second end face and a narrow end of the waveguide layer close to the second end face.

17. A method for fabricating a spot-size converter, the spot-size converter being provided with a first end face for coupling to an integrated optical waveguide and a second end face for coupling to an optical fiber, wherein the second end face is parallel to the first end face, the method comprising:

forming an isolation film layer on a substrate base;

forming a waveguide layer on the isolation film layer, a dimension of the waveguide layer in a second direction decreasing in a direction approaching the second end face, wherein the second direction is parallel to the first end face and the second end face and parallel to a bottom surface of the substrate base;

forming a cover film layer on the isolation film layer and the waveguide layer;

etching the cover film layer and the isolation film layer to form structures of a cover layer and an isolation layer, wherein the isolation layer is provided with a second recess and a third recess that are exposed to its top surface and the second end face, wherein a plurality of first holes are provided at a bottom of the second recess, and a plurality of second holes are provided at a bottom of the third recess, and wherein a portion of the isolation layer located between the second recess and the third recess forms a first transmission portion that extends to the second end face in a first direction, and the cover layer covers the waveguide layer and comprises a second transmission portion located on a surface of the first transmission portion and extending to the second end face in the first direction, the first direction being orthogonal to the first end face and the second end face; and etching the substrate base through the plurality of first holes and the plurality of second holes to form a structure of a substrate, wherein the substrate is provided with a first recess that is exposed to its top surface and the second end face, wherein the second recess communicates with the first recess through the plurality of first holes, and the third recess communicates with the first recess through the plurality of second holes.

18. The method according to claim 17, wherein the etching the cover film layer and the isolation film layer to form the structures of the cover layer and the isolation layer comprises:

etching the cover film layer and the isolation film layer to form a plurality of first sub-recesses arranged at intervals in the first direction and a plurality of second sub-recesses that are arranged at intervals in the first direction and disposed side by side with the plurality of first sub-recesses in the second direction, wherein a first supporting member is formed between adjacent first sub-recesses, and a second supporting member is formed between adjacent second sub-recesses; and etching to form a plurality of first holes at bottoms of the plurality of first sub-recesses, and etching to form a plurality of second holes at bottoms of the plurality of second sub-recesses.

* * * * *

20